(12) United States Patent
Lee et al.

(10) Patent No.: US 12,229,427 B2
(45) Date of Patent: Feb. 18, 2025

(54) ELECTRONIC DEVICE AND OPERATION METHOD OF ELECTRONIC DEVICE FOR MANAGING STORAGE SPACE

(71) Applicant: Samsung Electronics Co., Ltd., Suwon-si (KR)

(72) Inventors: Woojoong Lee, Suwon-si (KR); Yeongjin Gil, Suwon-si (KR); Jaewook Kim, Suwon-si (KR); Hyeongjun Kim, Suwon-si (KR); Sungjong Seo, Suwon-si (KR); Junbeom Yeom, Suwon-si (KR); Hobin Woo, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 10 days.

(21) Appl. No.: 18/071,056

(22) Filed: Nov. 29, 2022

(65) Prior Publication Data

US 2023/0168831 A1  Jun. 1, 2023

Related U.S. Application Data

(63) Continuation of application No. PCT/KR2022/018500, filed on Nov. 22, 2022.

(30) Foreign Application Priority Data

Nov. 30, 2021 (KR) .................. 10-2021-0169304
Feb. 3, 2022 (KR) .................. 10-2022-0014398

(51) Int. Cl.
*G06F 3/06* (2006.01)
*G06F 8/65* (2018.01)

(52) U.S. Cl.
CPC .......... *G06F 3/0644* (2013.01); *G06F 3/0665* (2013.01); *G06F 3/0679* (2013.01); *G06F 8/65* (2013.01); *G06F 3/0604* (2013.01)

(58) Field of Classification Search
CPC .... G06F 3/0644; G06F 3/0665; G06F 3/0679; G06F 8/65; G06F 3/0604
See application file for complete search history.

(56) References Cited

U.S. PATENT DOCUMENTS

| | | |
|---|---|---|
| 8,347,060 B2 | 1/2013 | Shimozono et al. |
| 9,753,646 B2 | 9/2017 | Carpenter et al. |

(Continued)

FOREIGN PATENT DOCUMENTS

| | | |
|---|---|---|
| CN | 105528302 A | 4/2016 |
| CN | 106610840 A | 5/2017 |

(Continued)

OTHER PUBLICATIONS

An aritcle titled Manage Voume and Partitions available online web.archive.org of help.gnome.org/users/gnome-help/stable/disk-partition (Year: 2015).*

(Continued)

*Primary Examiner* — Michael Krofcheck
*Assistant Examiner* — Janice M. Girouard
(74) *Attorney, Agent, or Firm* — Jefferson IP Law, LLP

(57) ABSTRACT

An electronic device is provided. The electronic device includes a storage device configured to include a first partition, a second partition, and a third partition, and a processor configured to configure the second partition as a first volume and the third partition as a second volume, and attach or detach the second volume to or from a file system to manage a storage space of the storage device.

23 Claims, 10 Drawing Sheets

(56) References Cited

U.S. PATENT DOCUMENTS

| | | | |
|---|---|---|---|
| 11,042,365 B2 | 6/2021 | Li et al. | |
| 11,086,538 B2 | 8/2021 | Lee et al. | |
| 2003/0018870 A1 | 1/2003 | Abboud et al. | |
| 2005/0066076 A1 | 3/2005 | Best et al. | |
| 2012/0054734 A1 | 3/2012 | Andrews et al. | |
| 2014/0208091 A1* | 7/2014 | Koning | G06F 8/65 713/2 |
| 2015/0242201 A1* | 8/2015 | Kim | G06F 3/0659 711/104 |
| 2016/0191480 A1* | 6/2016 | Hoshino | H04L 63/0428 713/171 |
| 2016/0269537 A1* | 9/2016 | Gandhi | H04W 4/50 |
| 2020/0183589 A1 | 6/2020 | Lee et al. | |
| 2022/0100490 A1 | 3/2022 | Hwang | |

FOREIGN PATENT DOCUMENTS

| | | |
|---|---|---|
| CN | 111562887 A | 8/2020 |
| KR | 10-2001-0098429 A | 11/2001 |
| KR | 10-0553921 B1 | 2/2006 |
| KR | 10-0811559 B1 | 3/2008 |
| KR | 10-1460452 B1 | 11/2014 |
| KR | 10-1692015 B1 | 1/2017 |
| KR | 10-2018-0045557 A | 5/2018 |
| KR | 10-2020-0068275 A | 6/2020 |
| KR | 10-2020-0090010 A | 7/2020 |
| WO | 2014/001870 A1 | 1/2014 |

OTHER PUBLICATIONS

A description of mounting/attaching volumes in the Linux operating system (Year: 2019).*

International Search Report with Written Opinion and English translation dated Feb. 27, 2023; International Appln. No. PCT/KR2022/018500.

Extended European Search Report dated Nov. 20, 2024, issued in European Patent Application No. 22901652.2.

* cited by examiner

ELECTRONIC DEVICE AND OPERATION METHOD OF ELECTRONIC DEVICE FOR MANAGING STORAGE SPACE

CROSS-REFERENCE TO RELATED APPLICATION(S)

This application is a continuation application, claiming priority under § 365(c), of an International application No. PCT/KR2022/018500, filed on Nov. 22, 2022, which is based on and claims the benefit of a Korean patent application number 10-2021-0169304, filed on Nov. 30, 2021, in the Korean Intellectual Property Office, and of a Korean patent application number 10-2022-0014398, filed on Feb. 3, 2022, in the Korean Intellectual Property Office, the disclosure of each of which is incorporated by reference herein in its entirety.

TECHNICAL FIELD

The disclosure relates to an electronic device for managing a storage space, and an electronic device operating method.

BACKGROUND ART

Recently developed electronic devices such as a smartphone, a tablet personal computer (PC), a portable multimedia player (PMP), a personal digital assistant (PDA), a laptop personal computer, and a wearable device can perform not only mobility, but also various functions (for example, gaming, social networking service (SNS), Internet, multimedia, photograph moving image capture and playback).

An electronic device may include a storage device such as a not-and (NAND) flash memory or solid state disk (SSD) to store a large amount of data used to perform various functions.

An electronic device may use a virtual memory management technique for efficiently storing and/or managing data. As an example of the virtual memory management technique, a main memory (for example, dynamic random access memory (DRAM)) and a storage (for example, non-volatile memory) are mapped to manage data and, among data stored in the storage, at least a part (for example, pages) used by the processor is loaded into the main memory and processed accordingly (demand paging type).

A storage included in a mobile terminal may be divided into a system partition in which execution files for driving the mobile terminal are stored, and a user data partition in which user data is stored.

In addition, the mobile terminal may receive firmware over-the-air (FOTA) after leaving the factory, and this may update execution files in the system partition area.

During the FOTA, functions of services or applications that drive the mobile terminal are improved, and this may increase the number of updated execution files stored in the system partition. The mobile terminal may increase the configured system partition in proportion to the number of updated execution files stored in the system partition, and may have a free space reserve included in the system partition. The free space reserve in the system partition may, however, permanently reduce the user data partition size.

"Dynamic volume management solution" refers to a method in which a system area and a user data area are configured as volumes with regard to a single physical partition, thereby sharing a data storage space. For example, the dynamic volume management solution maintains metadata for configuring each volume inside the partition such that, if the volume size is expanded, an area of the free space inside the partition may be allocated as much as needed, added to the volume, and managed.

The above information is presented as background information only to assist with an understanding of the disclosure. No determination has been made, and no assertion is made, as to whether any of the above might be applicable as prior art with regard to the disclosure.

DISCLOSURE

Technical Problem

In connection with the dynamic volume management solution, if a chunk of a data block constituting a volume is fragmented, if complicated security enhancement is made by applying write-protection provided at the storage level to a data block chunk constituting a read-only volume, or if the system data volume is reduced to increase the system volume size, it may be difficult to move files stored in the data block chunk constituting the user data volume.

Aspects of the disclosure are to address at least the above-mentioned problems and/or disadvantages and to provide at least the advantages described below. Accordingly, an aspect of the disclosure is to provide an electronic device for managing a free reserve space in connection with an increase in a number of files stored in a system partition such as firmware over-the-air (FOTA). In connection with managing a system data area and a user data area, an electronic device according to various embodiments of the disclosure may recognize a free reserve space as a volume and load the same, thereby dynamically managing the storage space managed through the file system.

Another aspect of the disclosure is to provide an electronic device that includes a volume manager such that the volume manager attaches a free reserve space to a file system and/or volume corresponding to a user data area or detaches the same, thereby resizing the file system and/or volume. As a result, the free reserve space that is not used after FOTA may be managed such that the same can be used in the user data area, thereby efficiently using the storage space.

Additional aspects will be set forth in part in the description which follows and, in part, will be apparent from the description, or may be learned by practice of the presented embodiments.

Technical Solution

In accordance with an aspect of the disclosure, an electronic device is provided. The electronic device includes a storage device configured to include a first partition, a second partition, and a third partition and a processor configured to configure the second partition as a first volume and the third partition as a second volume, and attach or detach the second volume to or from a file system to manage a storage space of the storage device.

In accordance with another aspect of the disclosure, an electronic device is provided. The electronic device includes a storage device configured to include a first partition, a second partition, and a third partition, and a processor configured to configure a first file system for managing the first partition, configure a second file system by using the second partition as a first volume and the third partition as a second volume, and manage a storage space of the storage device by attaching or detaching the second volume to or from the second file system.

In accordance with another aspect of the disclosure, a method of performed by an electronic device for managing a storage device including a first partition, a second partition, and a third partition is provided. The method includes configuring a first file system for managing the first partition, configuring a second file system by using the second partition as a first volume and the third partition as a second volume, and attaching or detaching the second volume to or from the second file system.

Advantageous Effects

According to various embodiments, an electronic device may efficiently use a storage space.

According to various embodiments, an electronic device may reduce waste of a temporary storage space for firmware over-the-air (FOTA).

According to various embodiments, an electronic device may configure a user data area by utilizing a temporary storage space for FOTA, and may store user data therein.

According to various embodiments, an electronic device may use a temporary storage space that remains after FOTA as a user data area for storing user data.

According to various embodiments, an electronic device may move data inside a volume, in response to absence of a temporary storage space, before FOTA, thereby securing a temporary storage space for FOTA.

Other aspects, advantageous, and salient features of the disclosure will become apparent to those skilled in the art from the following detailed description, which, taken in conjunction with the annexed drawings, discloses various embodiments of the disclosure.

DESCRIPTION OF DRAWINGS

The above and other aspects, features, and advantages of certain embodiments of the disclosure will be more apparent from the following description taken in conjunction with the accompanying drawings, in which.

The same reference numerals are used to represent the same elements throughout the drawings.

MODE FOR INVENTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
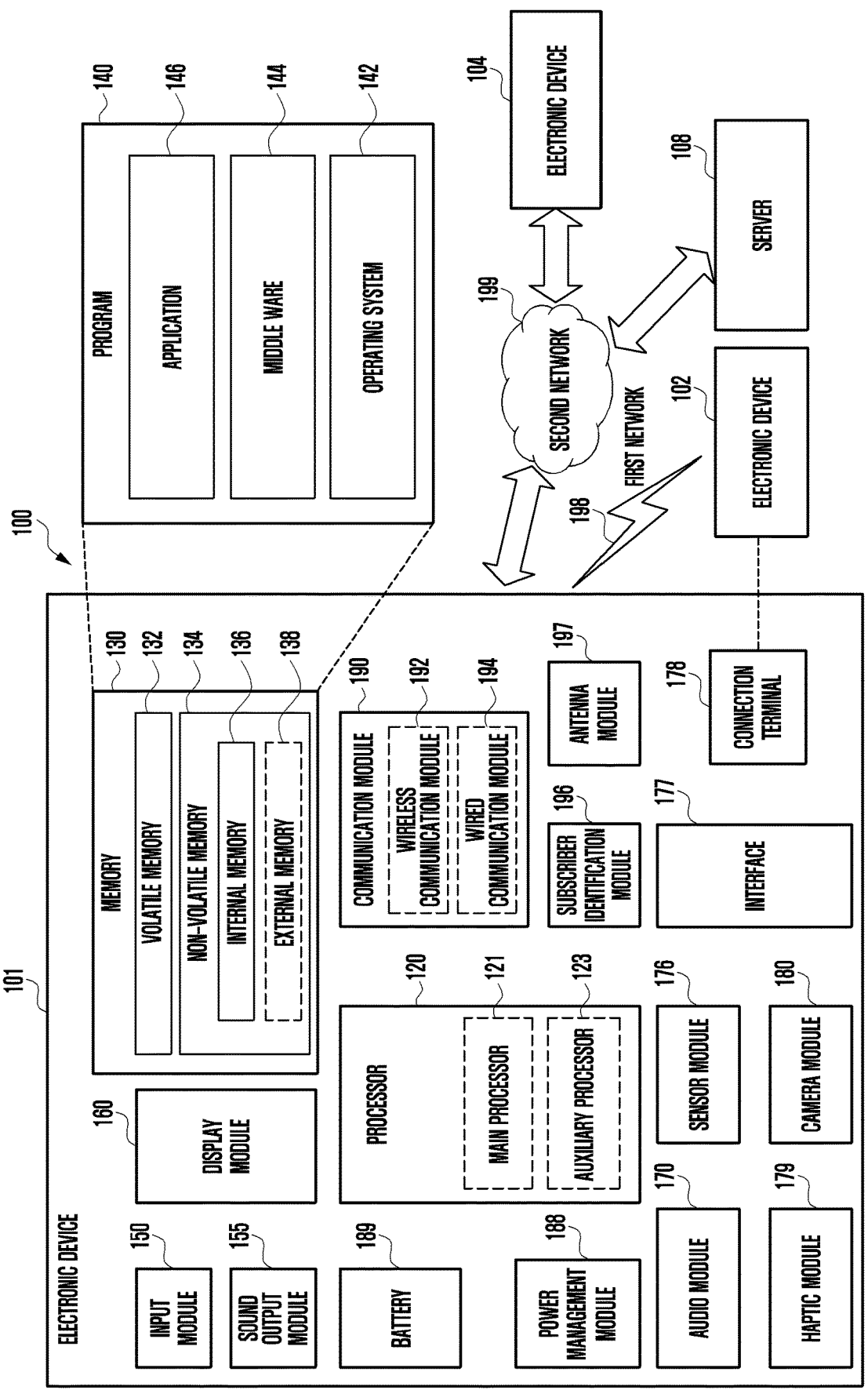
FIG. 1 is a block diagram illustrating an electronic device in a network environment according to an embodiment of the disclosure.

FIG. 1 is a block diagram illustrating an electronic device 101 in a network environment 100 according to an embodiment of the disclosure.

Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a fifth generation (5G) network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a fourth generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the millimeter wave (mmWave) band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
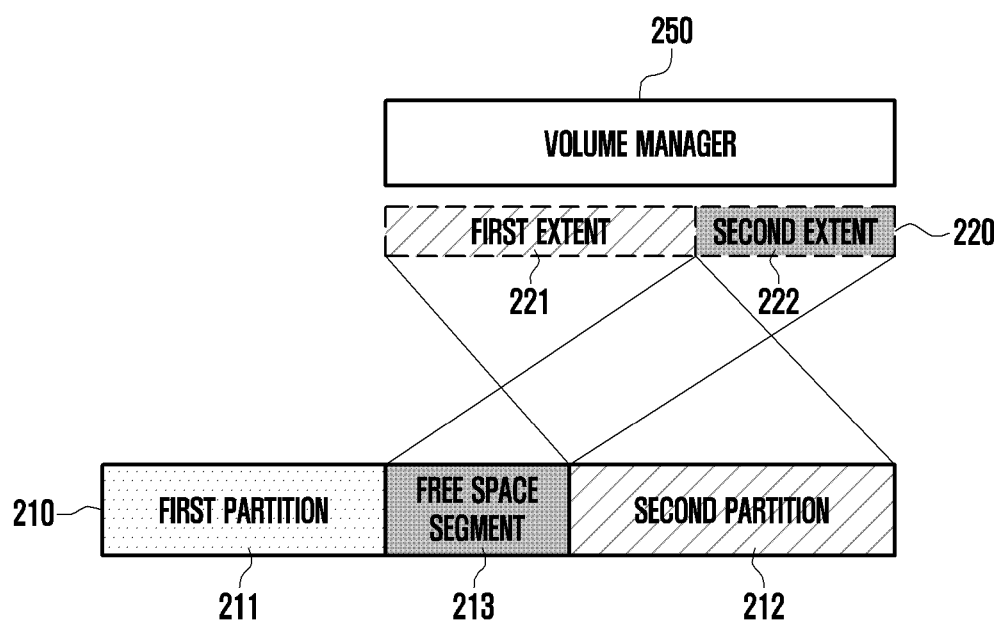
FIG. 2 is a block diagram from a physical point of view and a logical point of view of a storage space according to an embodiment of the disclosure.

FIG. 2 is a block diagram from a physical point of view and a logical point of view of a storage space according to an embodiment of the disclosure.

Referring to FIG. 2, a storage device according to various embodiments may include a non-volatile memory (e.g., the non-volatile memory 134 of FIG. 1). For example, the storage device (e.g., the memory 130 of FIG. 1) may be a not-and (NAND) flash memory or a storage device (e.g., SSD, universal flash storage (UFS), or embedded multimedia card (eMMC)) based on a NAND flash memory.

According to various embodiments, the storage device may include a device partition 210 corresponding to a physical partition. The device partition 210 may include a first partition 211, a second partition 212, and/or a free space segment 213 which are divided based on a physical address corresponding to a physical location of the memory 130.

According to an embodiment, the first partition 211 may be a system partition in which an executable file for driving an electronic device (e.g., the electronic device 101 of FIG. 1) is stored. For example, the first partition 211 may store system data (e.g., operating system (OS) data).

According to an embodiment, the free space segment 213 may be a temporary space (free-space reserve) for storing a file having an increased capacity in response to an executable file being updated according to a software update (e.g., firmware over-the-air (FOTA)) of the electronic device. For example, the free space segment 213 may be a temporary space for supplementing the storage space of system data such as the executable file.

According to an embodiment, the second partition 212 may be a user data partition in which user data is stored. For example, the second partition 212 may store user data (e.g., contacts, photos, music, or applications).

According to various embodiments, the storage device may include at least one file system. The file system may manage the spaces of the first partition 211, the second partition 212, and/or the free space segment 213 of the storage device. For example, the electronic device may load a first file system (e.g., a first file system 410 of FIG. 4A) into the first partition 211 of the storage device and a second file system (e.g., a second file system 420 of FIG. 4A) into the second partition 212 of the storage device. The file system may perform management of or access to files or data of the partitions, allocation of the storage space, and/or data integrity verification.

According to various embodiments, a volume manager 250 may configure a volume 220 based on a virtual address mapped to a physical address corresponding to a physical location of the memory 130. For example, the volume manager 250 may configure the volume 220 corresponding to the first partition 211, the second partition 212, and/or the free space segment 213 of the device partition 210, and may dynamically manage the volume 220.

According to an embodiment, the volume 220 may include a first extent 221 and/or a second extent 222. For example, the first extent 221 may correspond to the second partition 212, and the second extent 222 may correspond to the free space segment 213. For example, the volume manager 250 may configure the second partition 212 as the first extent 221 and the free space segment 213 as the second extent 222. According to various embodiments, the volume manager 250 may be included in a file system. According to an embodiment, the volume manager 250 may be a component included in the second file system 420.

According to various embodiments, unlike shown in FIG. 2, the volume manager 250 may be constituted of a plurality of modules.

According to various embodiments, unlike shown in FIG. 2, the volume manager 250 may generate a plurality of volumes 220. Each of the plurality of volumes 220 may mount a file system (e.g., the file system 420 of FIG. 4A). The volume manager 250 according to various embodiments is a software module, and the operation of the volume manager (e.g., the volume manager 250 of FIG. 2) described throughout the disclosure may be performed by a processor (e.g., the processor 120 of FIG. 1).

Figure 3:
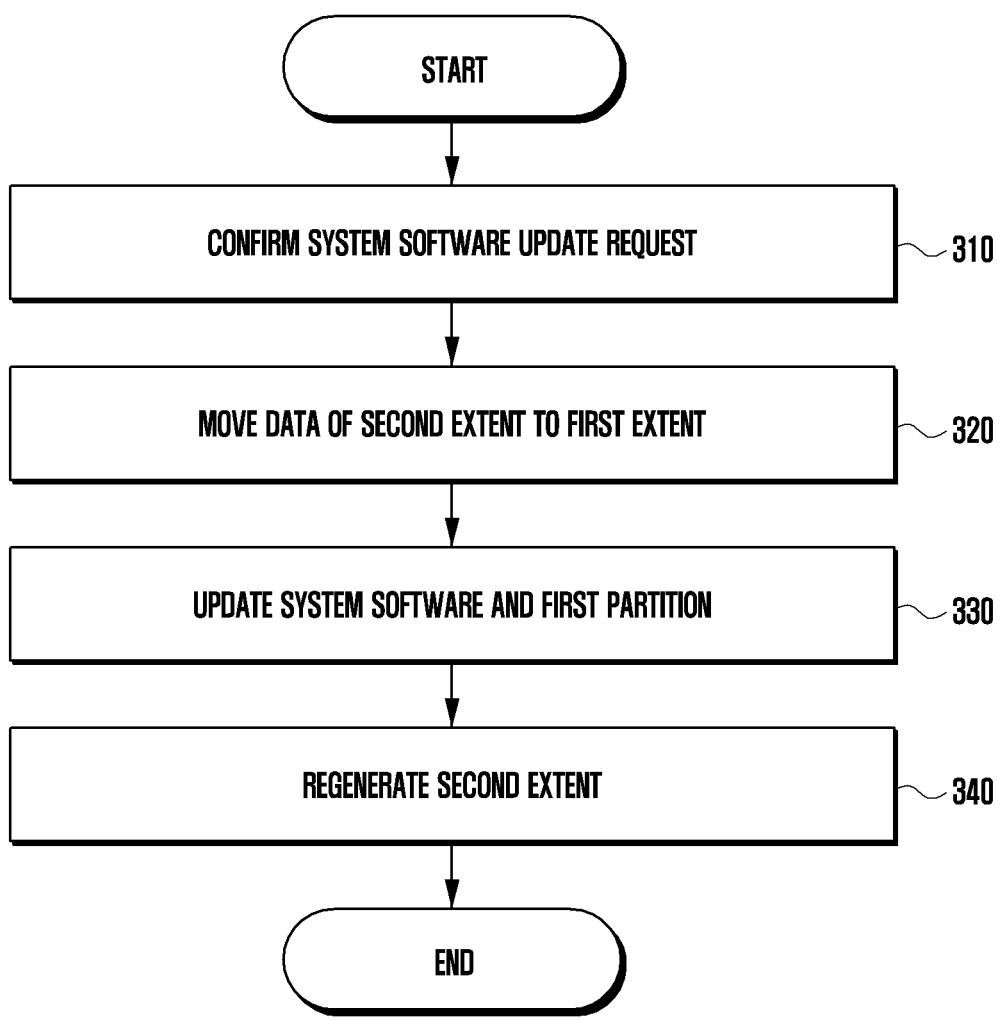
FIG. 3 is a flowchart illustrating a method for managing a volume according to an embodiment of the disclosure.

FIG. 3 is a flowchart illustrating a method for managing a volume according to an embodiment of the disclosure.

Although the operation of the volume manager (e.g., the volume manager 250 of FIG. 2) is described in FIG. 3, the volume manager 250 is a software module, and each operation of the volume manager 250 may be performed by a processor (e.g., the processor of FIG. 1).

Figure 4A:
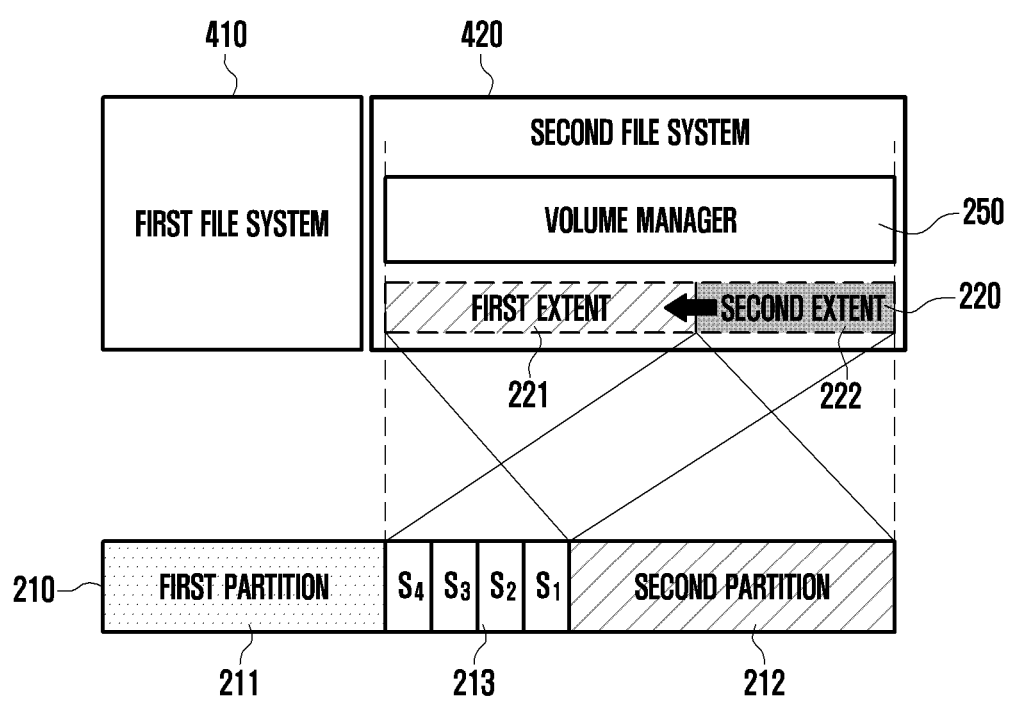
FIGS. 4A, 4B, and 4C are diagrams illustrating various embodiments corresponding to a method in which a volume manager included in a file system manages a volume in response to a system software update according to various embodiments of the disclosure.

Referring to FIG. 3, the volume manager (e.g., the volume manager 250 of FIG. 2) according to an embodiment may configure a second partition (e.g., the second partition 212 of FIG. 2) as a first extent (e.g., the first extent 221 of FIG. 2) and configure a free space segment (e.g., the free space segment 213 of FIG. 2) as a second extent (e.g., the second extent 222 of FIG. 2) to load a second file system (e.g., the second file system 420 of FIG. 4A).

According to various embodiments, in operation 310, the volume manager 250 may confirm a system software update request.

According to an embodiment, the volume manager 250 may confirm the system software update request. According to the system software update, the file capacity related to the system software stored in a first partition (e.g., the first partition 211 in FIG. 2) may increase, and the first partition 211 may require an additional storage space.

According to various embodiments, in operation 320, the volume manager 250 may move at least some of data blocks of the second extent 222 to the first extent 221.

According to an embodiment, the volume manager 250 may move at least some of file data blocks stored in the second extent 222 to the first extent 221 before performing the system software update. According to an embodiment, the volume manager 250 may guide a user to backup and delete at least a portion of user data in order to secure a free space in the second partition 212 corresponding to the first extent 221.

According to various embodiments, the volume manager 250 may detach the second extent 222 to which the at least some of the file data blocks are moved, from the second file system 420. For example, the volume manager 250 may remove the second extent 222 corresponding to the free space segment 213 from a management area of the second file system 420, and may perform a file system resizing operation (fs-resize) for reducing the size of the second file system 420 as the data block and/or capacity managed by the second file system 420 decreases. The second file system 420 may not access the second extent 222. For example, the volume manager 250 may store information of the second file system 420 resized in metadata 214 corresponding to the second file system 420.

According to various embodiments, in operation 330, the volume manager 250 may update the system software and the first partition 211.

According to various embodiments, in response to at least a portion of the data volume allocated to the second extent 222 being moved to the first extent 221, the volume manager 250 may cause an electronic device (e.g., the electronic device 101 of FIG. 1 or the processor 120 of FIG. 1) to perform a system software update operation. For example, the electronic device may acquire a new version of the system software file from a server and/or an external electronic device, and may store the acquired new version of the system software file in the first partition 211.

According to various embodiments, the volume manager 250 may update the first partition 211 as the electronic device performs a system software update operation. For example, the volume manager 250 may perform a file system resizing operation (fs-resize) for increasing the size of the first file system 410 managing the first partition 211 in response to an increase in the capacity of the system software file stored in the first partition 211. For example, the volume manager 250 may perform file system resizing so that the first file system 410 manages free blocks of the free space segment 213 corresponding to the increased capacity of the system software file. For example, the volume manager 250 may store the resized information of the first file system 410 in the metadata 214 corresponding to the first file system 410.

According to various embodiments, the volume manager 250 may reduce the area of the free space segment 213. For example, the volume manager 250 may reconfigure the area of the free space segment 213 to correspond to free blocks of the free space segment 213 remaining after being used for system software update in the first partition 211. For example, the volume manager 250 may store information related to the start and end positions of the reduced area of the free space segment 213 in a designated position.

According to various embodiments, in operation 340, the volume manager 250 may re-generate the second extent 222.

According to various embodiments, the volume manager 250 may attach the area of the free space segment 213 remaining after the system software update to the second file system 420. For example, the volume manager 250 may attach the free blocks of the free space segment 213 remaining after the system software update to the second file system 420 so that the second file system 420 manages the free blocks.

According to an embodiment, the volume manager 250 may generate the second extent 222 based on the information related to the start and end points of the area of the free space segment 213 corresponding to the free blocks of the free space segment 213 remaining after being used for system software update in the first partition 211. For example, the volume manager 250 may load the generated second extent 222 into the second file system 420 and may resize (fs-resize) the second file system 420. For example, the volume manager 250 may perform file system resizing so that the second file system 420 manages the remaining free blocks of the free space segment 213.

Figure 4B:
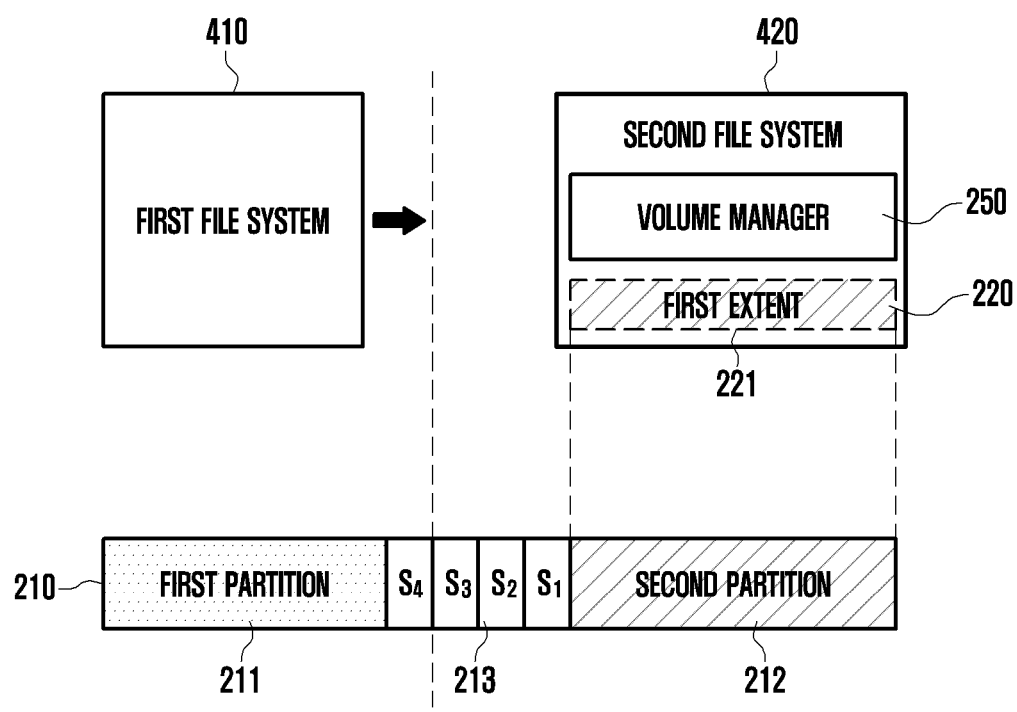
Figure 4C:
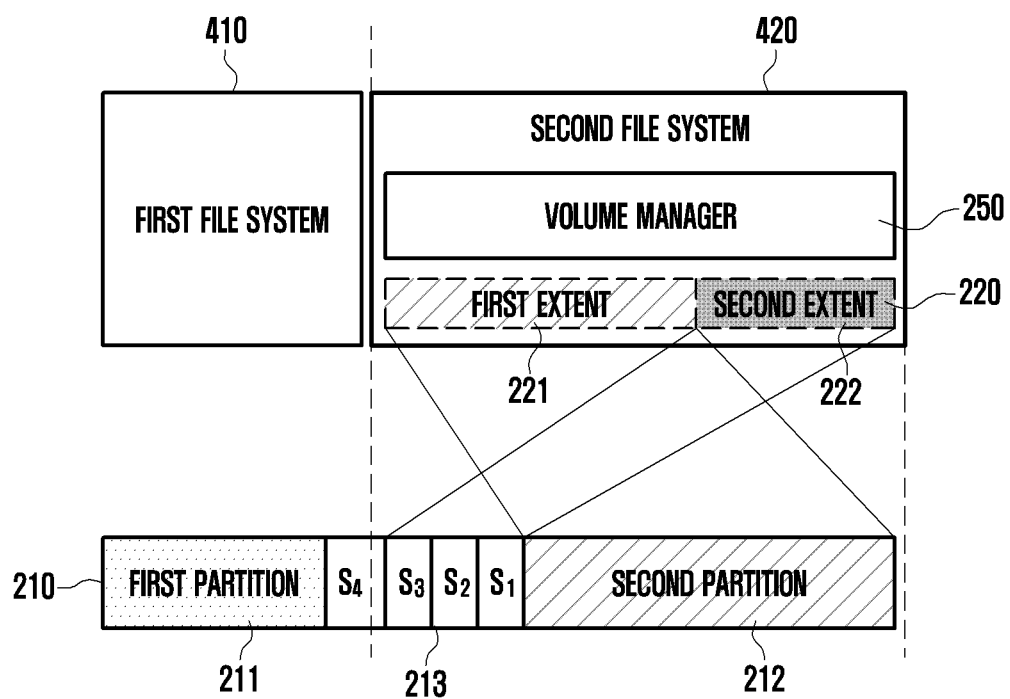

FIGS. 4A, 4B, and 4C are diagrams illustrating various embodiments corresponding to a method in which the volume manager 250 included in a file system manages a volume in response to a system software update according to various embodiments of the disclosure.

FIG. 4A illustrates an embodiment of an operation in which the volume manager 250 moves at least some of data blocks of the second extent 222 to the first extent 221 in response to a system software update according to an embodiment of the disclosure.

According to an embodiment, FIG. 4A may be the embodiment of operation 320 of FIG. 3.

According to various embodiments, the storage space shown in FIG. 4A may be in a state in which the free space segment 213 is maximally secured within a designated range.

According to various embodiments, the second file system 420 may include the volume manager 250 that manages the first extent 221 and/or the second extent 222. The volume manager 250 may configure the second partition 212 as the first extent 221 and the free space segment 213 as the second extent 222 to load the second file system 420.

According to various embodiments, in response to all data blocks of the first extent 221 being allocated when a file is stored, the electronic device may be allocated to data blocks of the second extent 222 and store the file.

According to various embodiments of the disclosure, in response to all data blocks of the first extent 221 being allocated when storing a file, the electronic device may store the file by being allocated to the data block of the second extent 222.

According to various embodiments, the volume manager 250 may confirm a system software update request. According to the system software update, the file capacity related to the system software stored in the first partition 211 may increase, and the first partition 211 may require an additional storage space.

According to various embodiments, before performing the system software update, the volume manager 250 may move at least some of the file data blocks stored in the second extent 222 to the first extent 221. According to an embodiment, the volume manager 250 may guide the user to backup and delete user data in order to secure a free space in the second partition 212 corresponding to the first extent 221.

According to various embodiments, the volume manager 250 may detach the second extent 222 to which the at least some of the file data blocks are moved from the second file system 420. For example, the volume manager 250 may remove the second extent 222 corresponding to the free space segment 213 from the management area of the second file system 420, and may perform a file system resizing (fs-resize) operation on the second file system 420 along with a reduction in the data block and/or capacity managed by the second file system 420. The second file system 420 may not access the second extent 222. For example, the volume manager 250 may store the resized information of the second file system 420 in the metadata 214 corresponding to the second file system 420.

FIG. 4B is a diagram illustrating an embodiment of an operation of the volume manager 250 updating system software and updating the first partition 211 according to an embodiment of the disclosure.

According to an embodiment, FIG. 4B may be the embodiment of operation 330 of FIG. 3.

According to various embodiments, the volume manager 250 may cause the electronic device to perform a system software update operation in response to at least a portion of the data volume allocated to the second extent 222 being moved to the first extent 221. For example, the electronic device may acquire a new version of the system software file from a server and/or an external electronic device, and may store the acquired new version of the system software file in the first partition 211.

According to various embodiments, the volume manager 250 may update the first partition 211 as the electronic device performs the system software update operation. For example, the volume manager 250 may perform a file system resizing (fs-resize) operation for increasing the size of the first file system 410 managing the first partition 211 in response to an increase in the capacity of the system software file stored in the first partition 211. For example, the volume manager 250 may perform file system resizing so that the first file system 410 manages free blocks (e.g., S4) of the free space segment 213 corresponding to the increased capacity of the system software file. For example, the volume manager 250 may store the resized information of the first file system 410 in the metadata 214 corresponding to the first file system 410.

According to various embodiments, the volume manager 250 may reduce the area of the free space segment 213. For example, the volume manager 250 may reconfigure the area of the free space segment 213 to correspond to free blocks S1, S2, and S3 of the free space segment 213 remaining after being used for the system software update. For example, the volume manager 250 may store information related to the start and end positions of the reduced area of the free space segment 213 in a designated position.

FIG. 4C is a diagram illustrating an embodiment of an operation in which the volume manager 250 regenerates the second extent 222 according to an embodiment of the disclosure.

According to an embodiment, FIG. 4C may be the embodiment of operation 340 of FIG. 3.

According to various embodiments, the volume manager 250 may attach the areas S1, S2, and S3 of the free space segment 213 remaining after the system software update to the second file system 420. For example, the volume manager 250 may attach the free blocks S1, S2, and S3 of the free space segment 213 remaining after the system software update, to the second file system 420 so that the second file system 420 manages the free blocks S1, S2, and S3.

According to an embodiment, the volume manager 250 may generate the second extent 222 based on information related to the start and end positions of the area of the free space segment 213 corresponding to the free blocks S1, S2, and S3 of the free space segment 213 remaining after being used for the system software update in the first partition 211. For example, the volume manager 250 may load the generated second extent 222 into the second file system 420 and may resize (fs-resize) the second file system 420. For example, the volume manager 250 may perform file system resizing so that the second file system 420 manages the remaining free blocks S1, S2, and S3 of the free space segment 213.

Figure 5A:
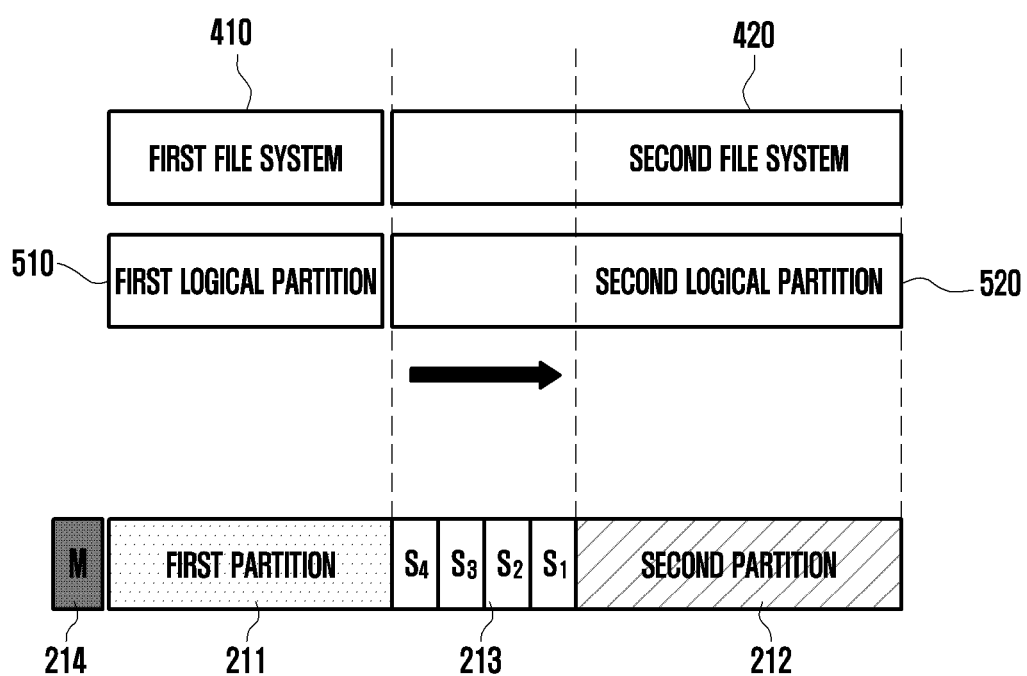
FIGS. 5A, 5B, and 5C are diagrams illustrating various embodiments corresponding to a method in which a volume manager separated from a file system manages a volume in response to a system software update according to various embodiments of the disclosure.
Figure 5B:
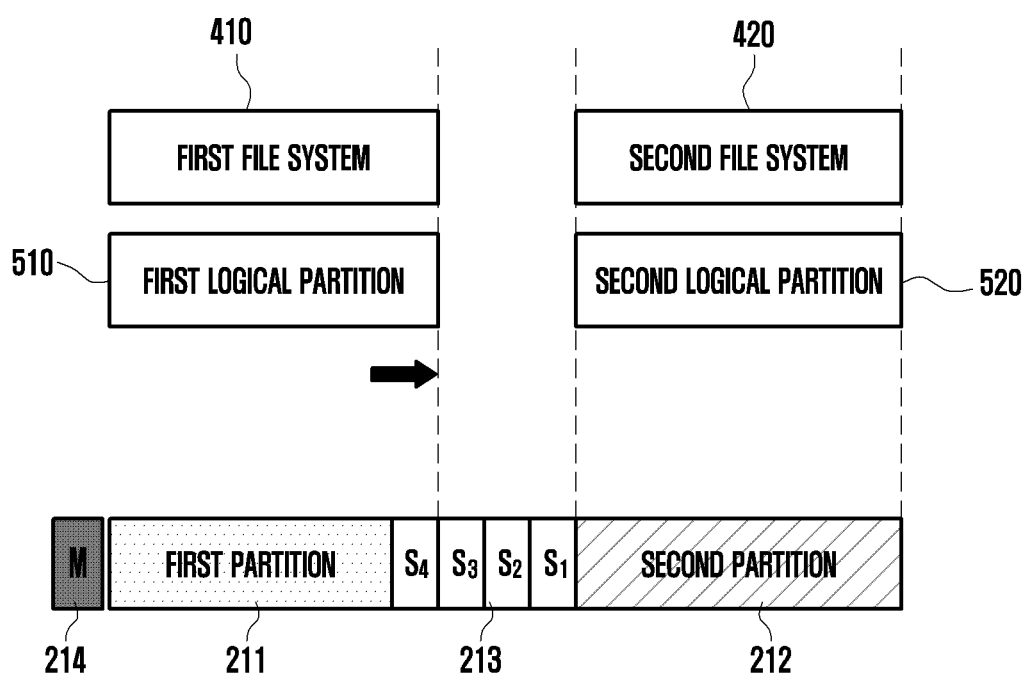
Figure 5C:
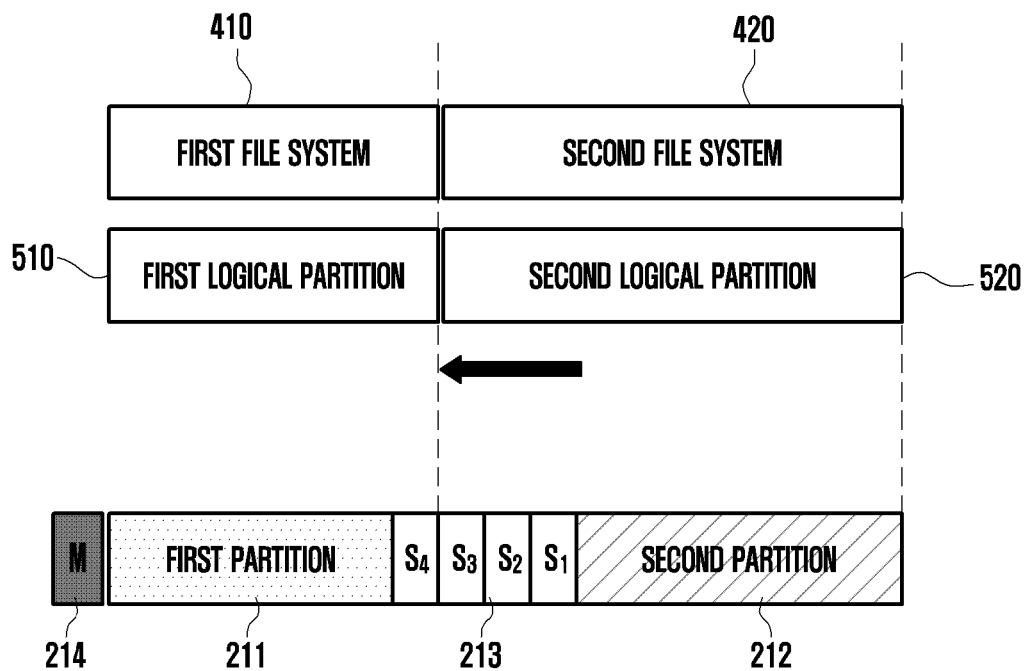

FIGS. 5A, 5B, and 5C are diagrams illustrating various embodiments corresponding to a method in which a volume manager (e.g., the volume manager 250 of FIG. 2) separated from a file system manages a volume in response to a system software update according to various embodiments of the disclosure.

FIG. 5A is a diagram illustrating an embodiment of an operation in which the volume manager 250 moves at least some of data blocks of the second extent 222 to the first extent 221 to correspond to system software update according to an embodiment of the disclosure.

According to an embodiment, FIG. 5A may be the embodiment of operation 320 of FIG. 3.

According to various embodiments, a first logical partition 510 may be mapped to the first partition 211 of the device partition 210, and a second logical partition 520 may be mapped to the first partition 211 of the device partition 210. The first file system 410 may be loaded into the first logical partition 510, and the second file system 420 may be loaded into the second logical partition 520.

According to various embodiments, the volume manager 250 may be separated from the file system and may manage the first logical partition 510 and the second logical partition 520 based on logical partition information M.

According to various embodiments, the storage space shown in FIG. 5A may be in a state in which the free space segment 213 is maximally secured within a designated range. For example, the storage space shown in FIG. 5A may be in a state in which the volume manager 250 is using the free space segment 213 by attaching the free space segment 213 to the second logical partition 520.

According to various embodiments, the volume manager 250 may confirm a system software update request. According to the system software update, the file capacity related to the system software stored in the first partition 211 may increase, and the first partition 211 may require an additional storage space.

According to various embodiments, before performing the system software update, the volume manager 250 may reduce the size of the second file system 420 loaded into the second logical partition 520 and may resize the second logical partition 520 by the reduced size of the second file system 420. For example, before performing the system software update, the volume manager 250 may move at least some of file data blocks stored in the area of the second logical partition 520 corresponding to the free space segment 213 to the area of the second logical partition 520 corresponding to the second partition 212. According to various embodiments, the volume manager 250 may remove an area corresponding to the free space segment 213 from a management area of the second file system 420 with respect to the second logical partition 520 to which the at least some of the file data blocks are moved, and may perform a file system resizing (fs-resize) operation for reducing the size of the second file system 420 along with a reduction in the data block and/or capacity managed by the second file system 420. For example, the volume manager 250 may store information of the resized second file system 420 in the metadata 214 corresponding to the second file system 420.

FIG. 5B is a diagram illustrating an embodiment of an operation in which the volume manager 250 updates system software and updates the first logical partition 510 according to an embodiment of the disclosure.

According to an embodiment, FIG. 5B may be the embodiment of operation 330 of FIG. 3.

According to various embodiments, the volume manager 250 may reconfigure the first logical partition 510 in response to the size of the second logical partition 520 being adjusted. For example, the volume manager 250 may attach at least one S4 of unused free blocks S1, S2, S3, and S4 of the free space segment 213 to the area of the first logical partition 510. For example, the volume manager 250 may perform a file system resizing (fs-resize) operation for increasing the size of the first file system 410 managing the first partition 211 in response to an increase in the capacity of the system software file stored in the first partition 211. For example, the volume manager 250 may perform the file system resizing operation so that the first file system 410 manages the free block (e.g., S4) of the free space segment 213 corresponding to the increased system software file capacity. For example, the volume manager 250 may store information of the resized first file system 410 in the metadata 214 corresponding to the first file system 410.

According to various embodiments, the volume manager 250 may perform system software update in the reconfigured first logical partition 510. For example, the volume manager 250 may cause the electronic device to perform a system software update operation in response to the first logical partition 510 being resized. For example, the electronic device may acquire a new version of the system software file from a server and/or an external electronic device, and may store the acquired new version of the system software file in the first partition 211 and/or the free block S4 corresponding to the first logical partition 510.

FIG. 5C is a diagram illustrating an embodiment of an operation in which the volume manager 250 reconfigures the second logical partition 520 according to an embodiment of the disclosure.

According to an embodiment, FIG. 5C may be the embodiment of operation 340 of FIG. 3.

According to various embodiments, the volume manager 250 may attach areas S1, S2 and S3 of the free space segment 213 remaining after a system software update to the second logical partition 520. For example, the volume manager 250 may attach the free blocks S1, S2, and S3 of the free space segment 213 remaining after the system software update to the second file system 420 so that the second file system 420 manages the free bocks S1, S2, and S3.

According to an embodiment, the volume manager 250 may increase the size of the second logical partition 520 and may also extend and use the size of the second file system 420 driven in the second logical partition 520 to correspond to the size of the second logical partition 520. For example, the volume manager 250 may resize (fs-resize) the second file system 420 to correspond to the size of the second logical partition 520. For example, the volume manager 250 may perform file system resizing so that the second file system 420 manages the remaining free blocks S1, S2, and S3 of the free space segment 213.

Figure 6:
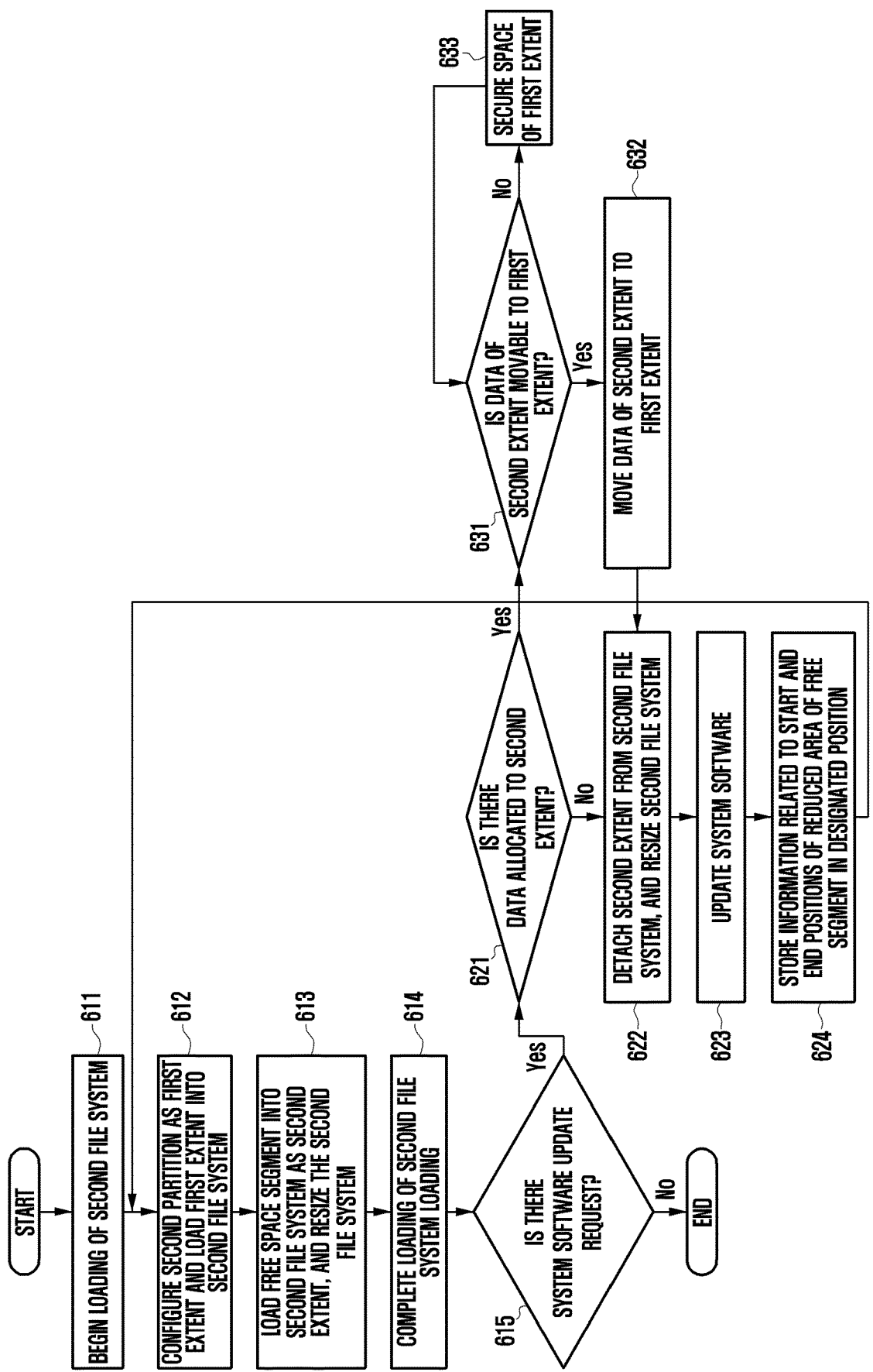
FIG. 6 is a diagram illustrating a method in which a volume manager manages a volume in response to a system software update according to an embodiment of the disclosure.

FIG. 6 is a diagram illustrating a method in which a volume manager manages a volume in response to a system software update according to an embodiment of the disclosure.

Although the operation of a volume manager (e.g., the volume manager 250 of FIG. 2) is described in FIG. 6, the volume manager 250 is a software module, and each operation of the volume manager 250 may be performed by a processor (e.g., the processor 120 of FIG. 1).

According to various embodiments, in operation 611, the volume manager 250 may begin loading of a second file system (e.g., the second file system 420 of FIG. 4A).

According to various embodiments, in operation 612, the volume manager 250 may configure the second partition 212 as a first extent (e.g., the first extent 221 of FIG. 2) and may load the first extent into the second file system 420.

According to various embodiments, in operation 613, the volume manager 250 may load a free space segment (e.g., the free space segment 213 of FIG. 2) into the second file system 420 as a second extent (e.g., the second extent 222 of FIG. 2), and may resize the second file system 420.

According to various embodiments, in operation 614, the volume manager 250 may complete loading of the second file system 420.

According to various embodiments, in operation 615, the volume manager 250 may determine whether there is a system software update request.

According to an embodiment, the volume manager 250 may confirm the system software update request. According to the system software update, the file capacity related to system software stored in a first partition (e.g., the first partition 211 of FIG. 1) may increase, and the first partition 211 may require an additional storage space.

According to various embodiments, in operation 621, the volume manager 250 may determine whether there is data allocated to the second extent 222 in response to the fact that there is the system software update request (e.g., operation 615—YES).

According to various embodiments, in operation 631, the volume manager 250 may determine whether the data of the second extent 222 is movable to the first extent 221 in response to the fact that there is the data allocated to the second extent (e.g., operation 621—YES).

According to various embodiments, in operation 633, the volume manager 250 may secure the space of the first extent 221 in response to the fact that the data of the second extent 222 is not movable to the first extent 221 (e.g., operation 631—NO).

According to an embodiment, the volume manager 250 may guide the user to backup and delete user data in order to secure a free space of a second partition (e.g., the second partition 212 of FIG. 2) corresponding to the first extent 221.

According to various embodiments, in operation 632, the volume manager 250 may move the data of the second extent 222 to the first extent 221 in response to the fact that the data of the second extent 222 is movable to the first extent 221 (e.g., operation 63—YES).

According to an embodiment, before performing a system software update, the volume manager 250 may move at least some of file data blocks stored in the second extent 222 to the first extent 221.

According to various embodiments, in operation 622, the volume manager 250 may detach the second extent 222 from the second file system 420 and may resize the second file system 420 in response to the fact that there is no data allocated to the second extent 222 (e.g., operation 621—NO).

According to an embodiment, the volume manager 250 may detach the second extent 222 to which the at least some of the file data blocks are moved from the second file system 420. For example, the volume manager 250 may remove the second extent 222 corresponding to the free space segment 213 from a management area of the second file system 420, and may perform a file system resizing (fs-resize) operation for reducing the size of the second file system 420 along with a reduction in the data block and/or capacity managed by the second file system 420. The second file system 420 may not access the second extent 222. For example, the volume manager 250 may store information of the resized second file system 420 in the metadata 214 corresponding to the second file system 420.

According to various embodiments, in operation 623, the volume manager 250 may cause the electronic device to perform a system software update.

According to an embodiment, the electronic device may acquire a new version of the system software file from a server and/or an external electronic device, and may store the acquired new version of the system software file in the first partition 211.

According to an embodiment, the volume manager 250 may update the first partition 211 as the electronic device performs a system software update operation. For example, the volume manager 250 may perform a file system resizing (fs-resize) operation for increasing the size of the first file system 410 managing the first partition 211 along with an increase in the capacity of the system software file stored in the first partition 211. For example, the volume manager 250 may perform file system resizing so that the first file system 410 manages free blocks of the free space segment 213 corresponding to the increased capacity of the system software file. For example, the volume manager 250 may store information of the resized first file system 410 in the metadata 214 corresponding to the first file system 410.

According to various embodiments, in operation 624, the volume manager 250 may store information related to the start and end positions of the reduced area of the free space segment 213 in a designated position.

According to an embodiment, the volume manager 250 may reduce the area of the free space segment 213. For example, the volume manager 250 may reconfigure the area of the free space segment 213 to correspond to the free blocks of the free space segment 213 remaining after being used for the system software update. For example, the volume manager 250 may store the information related to the start and end positions of the reduced area of the free space segment 213 in a designated position.

According to various embodiments, after operation 624, the volume manager 250 may reperform operation 612.

According to an embodiment, the volume manager 250 may attach the area of the free space segment 213 remaining after the system software update, to the second file system 420. For example, the volume manager 250 may attach the free blocks of the free space segment 213 remaining after the system software update, to the second file system 420 so that the second file system 420 manages the free blocks.

According to an embodiment, the volume manager 250 may generate the second extent 222 based on the information related to the start and end positions of the area of the free space segment 213 corresponding to the free blocks of the free space segment 213 remaining after being used for the system software update in the first partition 211. For example, the volume manager 250 may load the generated second extent 222 into the second file system 420, and may resize (fs-resize) the second file system 420. For example, the volume manager 250 may perform file system resizing so that the remaining free blocks of the free space segment 213 are managed by the second file system 420.

An electronic device according to various embodiments may include a storage device configured to include a first partition, a second partition, and a third partition, and a processor configured to configure the second partition as a first volume and the third partition as a second volume, and may attach or detach the second volume to or from a file system to manage a storage space of the storage device.

In the electronic device according to various embodiments, the first partition may be a system partition in which an executable file for driving the electronic device is stored, the second partition may be a user data partition in which user data is stored, and the third partition may be a temporary space for supporting a storage space of the executable file for the system partition.

In the electronic device according to various embodiments, the processor may confirm a request for a system software update of the electronic device, may move data stored in the second volume to the first volume, may detach the second volume from the file system, and may store a file for the system software update in the third partition to perform the system software update.

In the electronic device according to various embodiments, the processor may resize the file system from which the second volume is detached, and may store information related to the resized file system in a metadata area of the file system.

In the electronic device according to various embodiments, before moving the data stored in the second volume to the first volume, the processor may guide a user to backup and delete the user data in order to secure a free space of the second partition corresponding to the first volume in response to a lack of a space to store the data stored in the second volume, in the first volume.

In the electronic device according to various embodiments, the processor may store information related to start and end positions of an area for a space remaining after the file for the system software update is stored in the third partition, may reconfigure the space remaining after the file for the system software update is stored in the third partition as the second volume based on the stored information, and may attach the reconfigured second volume to the file system.

In the electronic device according to various embodiments, when storing a file, the processor may store the file in data blocks of the second volume in response to all data blocks of the first volume being allocated.

An electronic device according to various embodiments may include a storage device configured to include a first partition, a second partition, and a third partition, and a processor configured to configure a first file system for managing the first partition, may configure a second file system by using the second partition as a first volume and the third partition as a second volume, and may manage a storage space of the storage device by attaching or detaching the second volume to or from the second file system.

In the electronic device according to various embodiments, the first partition may be a system partition in which a system file for driving the electronic device is stored, the second partition may be a user data partition in which user data is stored, and the third partition may be a temporary space for supporting a storage space of an executable file for the system partition.

In the electronic device according to various embodiments, the processor may confirm a request for a system software update of the electronic device, may move data stored in the second volume to the first volume, may detach the second volume from the second file system, and may store a file for the system software update in the third partition to perform the system software update.

In the electronic device according to various embodiments, the processor may resize the second file system from which the second volume is detached, and may store information related to the resized second file system in a metadata area of the second file system.

In the electronic device according to various embodiments, before moving the data stored in the second volume to the first volume, the processor may guide a user to backup and delete the user data to secure a free space of the second partition corresponding to the first volume in response to a lack of a space to store the data stored in the second volume, in the first volume.

In the electronic device according to various embodiments, the processor may extend the first file system by a space for storing the file for the system software update in the third partition.

In the electronic device according to various embodiments, the processor may store information related to start and end positions of an area for a space remaining after the file for the system software update is stored in the third partition, in a designated position, and may reconfigure the space remaining after the file for the system software update is stored in the third partition as the second volume and attach the reconfigured second volume to the second file system.

In the electronic device according to various embodiments, when storing a file, the processor may store the file in data blocks of the second volume in response to all data blocks of the first volume being allocated.

A method performed by an electronic device for managing a storage device including a first partition, a second partition, and a third partition, may include configuring a first file system for managing the first partition, configuring a second file system by using the second partition as a first volume and the third partition as a second volume, and attaching or detaching the second volume to or from the second file system.

In the method of operating the electronic device according to various embodiments, the first partition may be a system partition in which a system file for driving the electronic device is stored, the second partition may be a user data partition in which user data is stored, and the third partition may be a temporary space for supporting a storage space of an executable file for the system partition.

The method of operating the electronic device according to various embodiments may further include confirming a request for a system software update of the electronic device, moving data stored in the second volume to the first volume, detaching the second volume from the second file system, and storing a file for the system software update in the third partition to perform the system software update.

The method of operating the electronic device according to various embodiments may further include resizing the second file system from which the second volume is detached, and storing information related to the resized second file system in a metadata area of the second file system.

The method of operating the electronic device according to various embodiments may further include, before moving the data stored in the second volume to the first volume, guiding a user to backup and delete the user data to secure a free space of the second partition corresponding to the first volume in response to a lack of a space to store the data stored in the second volume, in the first volume.

The method of operating the electronic device according to various embodiments may further include extending the first file system by a space for storing the file for the system software update in the third partition.

The method of operating the electronic device according to various embodiments may further include storing information related to start and end positions of an area for a space remaining after the file for the system software update is stored in the third partition, in a designated position, and reconfiguring the space remaining after the file for the system software update is stored in the third partition as the second volume and attaching the reconfigured second volume to the second file system.

The method of operating the electronic device according to various embodiments may further include, when storing a file, storing the file in data blocks of the second volume in response to all data blocks of the first volume being allocated.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
   a storage device including a first partition, a second partition, and a third partition, the first partition included in a first file system is a system partition, the second partition included in a second file system is a user data partition, and the third partition included in the second file system is a temporary space for supporting a storage space; and
   a processor configured to:
   configure the second partition as a first volume and the third partition as a second volume,
   detach, in response to a request for a system software update of the electronic device, the second volume from the second file system,
   store a file for the system software update in the first partition,
   attach at least one of free block of the second volume to the first partition,
   perform resizing the first partition so that the first file system manages the second volume in response to a size of the file for the system software update,
   perform the system software update, and
   attach a space remaining of the second volume to the second file system.

2. The electronic device of claim 1, wherein the processor is further configured to:
   confirm the request for the system software update of the electronic device, and
   move data stored in the second volume to the first volume.

3. The electronic device of claim 2, wherein the processor is further configured to:
   resize the second file system from which the second volume is detached, and
   store information related to the resized second file system in a metadata area of the second file system.

4. The electronic device of claim 2, wherein the processor is further configured to:
   guide, before moving the data stored in the second volume to the first volume, a user to backup and delete user data in order to secure a free space of the second partition corresponding to the first volume in response to a lack of space to store the data stored in the second volume, in the first volume.

5. The electronic device of claim 2, wherein the processor is further configured to:
   store information related to start and end positions of an area for a space remaining after the file for the system software update is stored in the third partition, and
   reconfigure the space remaining after the file for the system software update is stored in the third partition as the second volume based on the stored information.

6. The electronic device of claim 2, wherein the system software update is a firmware over-the-air (FOTA) system software update.

7. The electronic device of claim 1, wherein the processor is further configured to:
   store, when storing a file, the file in data blocks of the second volume in response to all data blocks of the first volume being allocated.

8. An electronic device comprising:
   a storage device including a first partition, a second partition, and a third partition, the first partition is a system partition, the second partition is a user data partition, and the third partition is a temporary space for supporting a storage space; and
   a processor configured to:
   configure a first file system for managing the first partition,
   configure a second file system by using the second partition as a first volume and the third partition as a second volume,
   detach, in response to a request for a system software update of the electronic device, the second volume from the second file system,
   store a file for the system software update in the first partition,
   attach at least one of free block of the second volume to the first partition,
   perform resizing the first partition so that the first file system manages the second volume in response to a size of the file for the system software update,
   perform the system software update, and
   attach a space remaining of the second volume to the second file system.

9. The electronic device of claim 8, wherein the processor is further configured to:
   confirm the request for the system software update of the electronic device, and
   move data stored in the second volume to the first volume.

10. The electronic device of claim 9, wherein the processor is further configured to:
    resize the second file system from which the second volume is detached, and
    store information related to the resized second file system in a metadata area of the second file system.

11. The electronic device of claim 9, wherein the processor is further configured to:
    guide, before moving the data stored in the second volume to the first volume, a user to backup and delete user data to secure a free space of the second partition corresponding to the first volume in response to a lack of a space to store the data stored in the second volume, in the first volume.

12. The electronic device of claim 9, wherein the processor is further configured to:
    extend the first file system by a space for storing the file for the system software update in the third partition.

13. The electronic device of claim 9, wherein the processor is further configured to:
store information related to start and end positions of an area for a space remaining after the file for the system software update is stored in the third partition, in a designated position, and
reconfigure the space remaining after the file for the system software update is stored in the third partition as the second volume.

14. The electronic device of claim 9, wherein the system software update is a firmware over-the-air (FOTA) system software update.

15. The electronic device of claim 8, wherein the processor is further configured to:
store, when storing a file, the file in data blocks of the second volume in response to all data blocks of the first volume being allocated.

16. A method performed by an electronic device for managing a storage device including a first partition, a second partition, and a third partition, the first partition is a system partition, the second partition is a user data partition, and the third partition is a temporary space for supporting a storage space, the method comprising:
configuring, by the electronic device, a first file system for managing the first partition;
configuring, by the electronic device, a second file system by using the second partition as a first volume and the third partition as a second volume;
detaching, by the electronic device, in response to a request for a system software update of the electronic device, the second volume from the second file system;
storing, by the electronic device, a file for the system software update in the first partition;
attaching, by the electronic device, at least one of free block of the second volume to the first partition;
performing, by the electronic device, resizing the first partition so that the first file system manages the second volume in response to a size of the file for the system software update;
performing, by the electronic device, the system software update; and
attaching, by the electronic device, a space remaining of the second volume to the second file system.

17. The method of claim 16, further comprising:
confirming, by the electronic device, the request for the system software update of the electronic device; and
moving, by the electronic device, data stored in the second volume to the first volume.

18. The method of claim 17, further comprising:
resizing, by the electronic device, the second file system from which the second volume is detached; and
storing, by the electronic device, information related to the resized second file system in a metadata area of the second file system.

19. The method of claim 17, further comprising:
guiding, by the electronic device, before moving the data stored in the second volume to the first volume, a user to backup and delete user data to secure a free space of the second partition corresponding to the first volume in response to a lack of a space to store the data stored in the second volume, in the first volume.

20. The method of claim 17, further comprising:
extending, by the electronic device, the first file system by a space for storing the file for the system software update in the third partition.

21. The method of claim 17, further comprising:
storing, by the electronic device, information related to start and end positions of an area for a space remaining after the file for the system software update is stored in the third partition, in a designated position; and
reconfiguring, by the electronic device, the space remaining after the file for the system software update is stored in the third partition as the second volume.

22. The method of claim 17, wherein the system software update is a firmware over-the-air (FOTA) system software update.

23. The method of claim 16, further comprising:
storing, when storing a file, the file in data blocks of the second volume in response to all data blocks of the first volume being allocated.

* * * * *